United States Patent
Stewart et al.

(10) Patent No.: US 10,499,559 B2
(45) Date of Patent: Dec. 10, 2019

(54) HANDLE MOUNTED CONTROL SYSTEM FOR A BROADCAST SPREADER

(71) Applicant: Home Depot Product Authority, LLC, Atlanta, GA (US)

(72) Inventors: Craig Stewart, Atlanta, GA (US); Dominic Lovely, Centennial, CO (US); Brent Christopher, Centennial, CO (US)

(73) Assignee: Home Depot Product Authority, LLC, Atlanta, GA (US)

( * ) Notice: Subject to any disclaimer, the term of this patent is extended or adjusted under 35 U.S.C. 154(b) by 132 days.

(21) Appl. No.: 15/591,879

(22) Filed: May 10, 2017

(65) Prior Publication Data
US 2018/0169681 A1    Jun. 21, 2018

Related U.S. Application Data

(60) Provisional application No. 62/435,005, filed on Dec. 15, 2016.

(51) Int. Cl.
*A01C 17/00* (2006.01)

(52) U.S. Cl.
CPC .................................. *A01C 17/008* (2013.01)

(58) Field of Classification Search
CPC .. A01C 7/02; A01C 7/16; A01C 7/163; A01C 7/166; A01C 17/00; A01C 17/003; A01C 17/006; A01C 17/008
USPC ........ 239/650, 652, 665, 668, 669, 676, 681
See application file for complete search history.

(56) References Cited

U.S. PATENT DOCUMENTS

| | | | | |
|---|---|---|---|---|
| 1,751,928 A | * | 3/1930 | Lachner | E01C 19/203 239/687 |
| 2,817,460 A | * | 12/1957 | Bond | A01C 15/16 222/310 |
| 3,383,055 A | * | 5/1968 | Speicher | A01C 17/006 239/687 |
| 3,738,546 A | * | 6/1973 | Speicher | A01C 7/10 222/410 |
| 4,027,788 A | * | 6/1977 | Parker | A01C 7/02 222/486 |
| 4,106,704 A | * | 8/1978 | McRoskey | A01C 15/02 222/625 |
| 4,121,733 A | * | 10/1978 | McRoskey | A01C 15/02 222/45 |
| 4,180,184 A | * | 12/1979 | Florer | A01C 15/02 222/41 |
| 4,402,438 A | * | 9/1983 | Gregory | A01C 15/02 222/43 |

(Continued)

OTHER PUBLICATIONS https://www.amazon.com/dp/B01IU4E9PY?psc=1, Amazon.com: Chapin Professional Spreader—All Season 80-Pound Capacity: Paio, Lawn & Garden, Sep. 21, 2016. 5 pgs.

*Primary Examiner* — Viet Le
(74) *Attorney, Agent, or Firm* — Greenberg Traurig, LLP (57) ABSTRACT

A control apparatus for a broadcast spreader includes a gate adjustment dial mounted on, and generally coaxial with, a handle portion of a handle assembly of the spreader. Rotation of the gate adjustment dial in a first direction causes an increase in a current maximum discharge rate of the spreader and rotation of the gate adjustment dial in a second direction causes a decrease in the current maximum discharge rate of the spreader.

20 Claims, 9 Drawing Sheets

(56) References Cited

U.S. PATENT DOCUMENTS

| | | | | |
|---|---|---|---|---|
| 4,469,210 A * | 9/1984 | Blumer | B65G 47/44 | |
| | | | 193/22 | |
| 4,487,370 A * | 12/1984 | Speicher | A01C 15/02 | |
| | | | 222/410 | |
| 4,497,446 A * | 2/1985 | van der Lely | A01C 17/006 | |
| | | | 239/661 | |
| 4,561,595 A * | 12/1985 | van der Lely | A01C 17/006 | |
| | | | 239/676 | |
| 4,588,133 A * | 5/1986 | Brabb | A01C 7/16 | |
| | | | 222/561 | |
| 4,597,531 A * | 7/1986 | Kise | A01C 17/006 | |
| | | | 239/650 | |
| 4,635,818 A * | 1/1987 | Glass | A01C 15/02 | |
| | | | 222/41 | |
| 4,671,434 A * | 6/1987 | Johnston | A01C 15/02 | |
| | | | 222/502 | |
| 4,681,265 A * | 7/1987 | Brabb | A01C 15/02 | |
| | | | 239/665 | |
| 4,867,381 A * | 9/1989 | Speicher | A01C 15/02 | |
| | | | 239/665 | |
| 5,123,598 A * | 6/1992 | Courtney | A01C 15/02 | |
| | | | 222/473 | |
| 5,145,116 A * | 9/1992 | Shaver | A01C 17/006 | |
| | | | 239/665 | |
| 5,288,017 A * | 2/1994 | Halovitz | A01C 15/02 | |
| | | | 222/625 | |
| 5,340,033 A * | 8/1994 | Whitell | A01C 15/007 | |
| | | | 239/661 | |
| D373,367 S * | 9/1996 | Havlovitz | D15/13 | |
| 5,570,814 A * | 11/1996 | Havlovitz | A01C 15/02 | |
| | | | 222/235 | |
| 5,597,092 A * | 1/1997 | Havlovitz | A01C 15/02 | |
| | | | 222/235 | |
| D384,679 S * | 10/1997 | Havlovitz | D15/13 | |
| 5,842,648 A * | 12/1998 | Havlovitz | A01C 7/02 | |
| | | | 239/650 | |
| 6,138,927 A * | 10/2000 | Spear | A01C 15/02 | |
| | | | 239/666 | |
| 6,336,600 B1 * | 1/2002 | Jessen | A01C 7/06 | |
| | | | 239/155 | |
| 6,616,074 B2 * | 9/2003 | Courtney | A01C 15/008 | |
| | | | 239/666 | |
| 7,063,280 B1 * | 6/2006 | Bogart | A01C 17/008 | |
| | | | 239/505 | |
| 7,654,476 B2 * | 2/2010 | Courtney | A01C 15/008 | |
| | | | 239/505 | |
| 7,837,073 B2 * | 11/2010 | Havlovitz | A01C 15/02 | |
| | | | 222/625 | |
| 7,854,402 B1 * | 12/2010 | Travis | E02F 3/6436 | |
| | | | 239/661 | |
| 8,056,838 B2 * | 11/2011 | Conner | A01C 17/006 | |
| | | | 222/625 | |
| 8,074,904 B1 * | 12/2011 | Hobbs | A01C 15/02 | |
| | | | 239/652 | |
| 8,376,250 B2 * | 2/2013 | Conner | A01C 17/006 | |
| | | | 239/650 | |
| 8,382,014 B2 * | 2/2013 | Cichy | A01C 17/001 | |
| | | | 239/676 | |
| 8,757,521 B2 * | 6/2014 | Cichy | A01C 17/001 | |
| | | | 239/676 | |
| 2002/0014545 A1 * | 2/2002 | Woodruff | A01C 15/02 | |
| | | | 239/650 | |
| 2007/0194155 A1 * | 8/2007 | Kendall | A01C 17/006 | |
| | | | 239/650 | |
| 2010/0230507 A1 * | 9/2010 | Conner | A01C 17/006 | |
| | | | 239/1 | |
| 2011/0278381 A1 * | 11/2011 | Aral | A01C 15/122 | |
| | | | 239/676 | |
| 2013/0292483 A1 * | 11/2013 | Kendall | A01C 15/02 | |
| | | | 239/1 | |
| 2014/0263762 A1 * | 9/2014 | Trull | A01C 17/005 | |
| | | | 239/650 | |

* cited by examiner

HANDLE MOUNTED CONTROL SYSTEM FOR A BROADCAST SPREADER

CLAIM OF PRIORITY UNDER 35 U.S.C. § 119

The present application for patent claims priority to Provisional Application No. 62/435,005 entitled "Broadcast Spreader" filed Dec. 15, 2016, and assigned to the assignee hereof and hereby expressly incorporated by reference herein.

BACKGROUND

Conventional broadcast spreaders and their associated control mechanisms do not provide a convenient mechanism for adjusting the aperture of the spreader gate. Most often, broadcast spreaders include an adjustment dial that is located at or near the spreader's hopper. This is inconvenient, because the user must reach past the spreader handle to adjust the gate's aperture, and that often involves ceasing pushing of the spreader, which in turn ceases the disbursement of the material in the hopper. It is therefore difficult for the user to gauge the amount of adjustment that is appropriate without resuming pushing the spreader, observing the amount of disbursement and then potentially repeating that same cycle one or more times. Other conventional broadcast spreaders may include an adjustment dial closer to the handle, but such dials still require the user to remove at least one hand from the handlebar(s) of the spreader, which may also require the user to again cease pushing the spreader.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Generally speaking, various embodiments provide for a broadcast spreader with an improved control mechanism that permits the user to make adjustments "on-the-fly" and, in some cases, without the user having to completely remove either of her hands from the spreader handlebar. In some cases, this is achieved by positioning a gate adjustment dial coaxially with the handlebar so that the user may adjust the maximum gate aperture with a simple forward or backward rotation of the hand.

Figure 1:
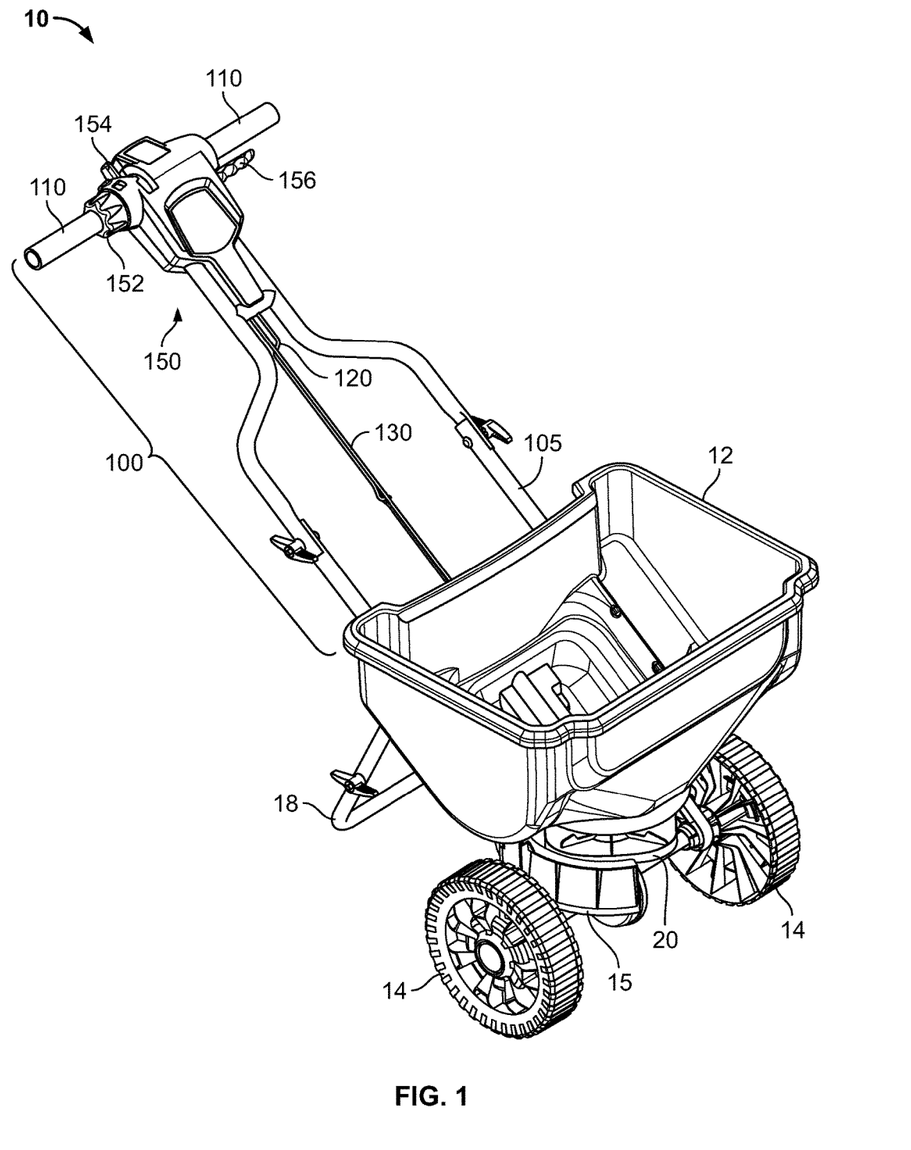
FIG. 1 is a first perspective view of a broadcast spreader, in accordance with various embodiments of the present invention.
Figure 2:
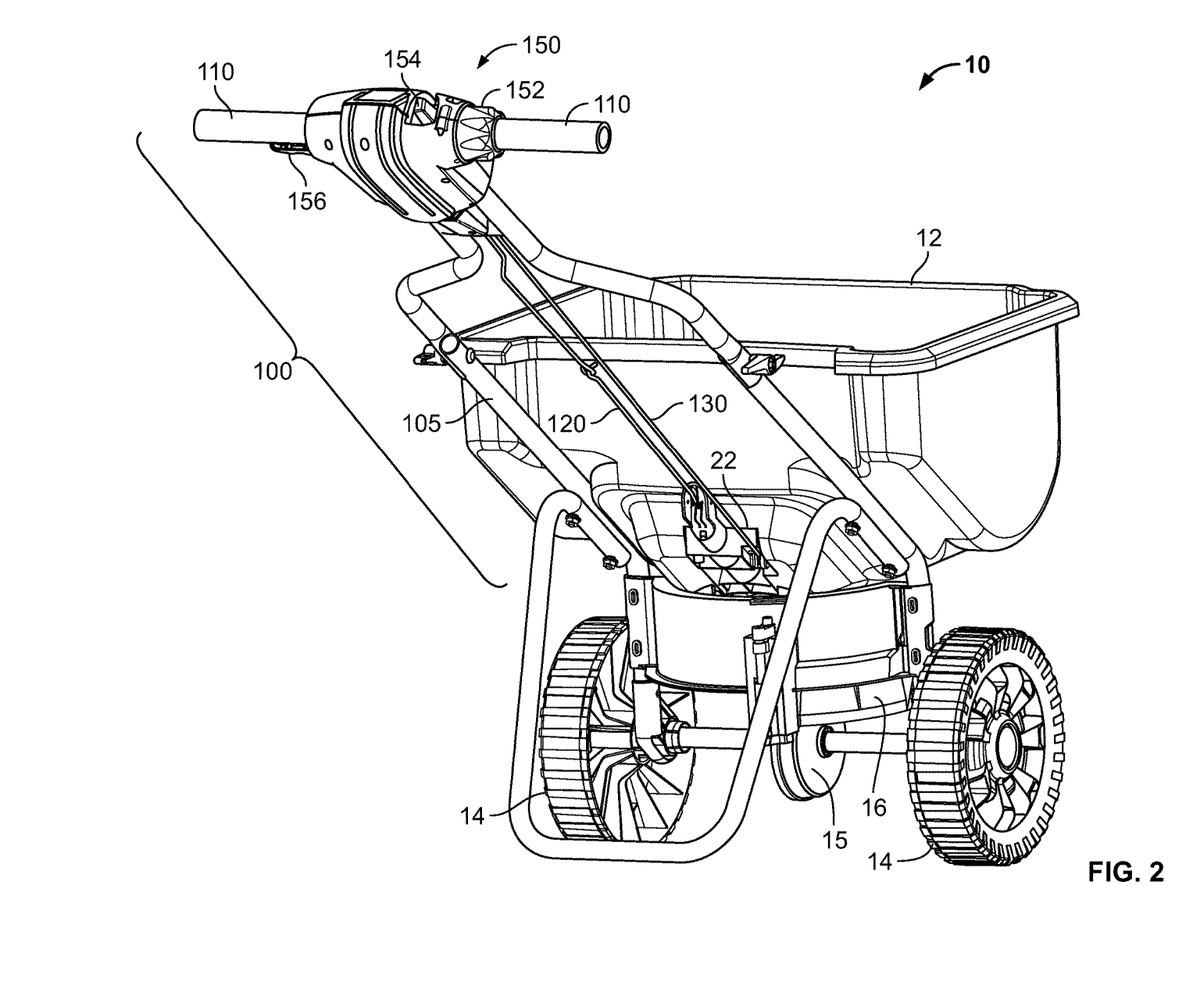
FIG. 2 is a second perspective view of a broadcast spreader, in accordance with various embodiments of the present invention.
Figure 3:
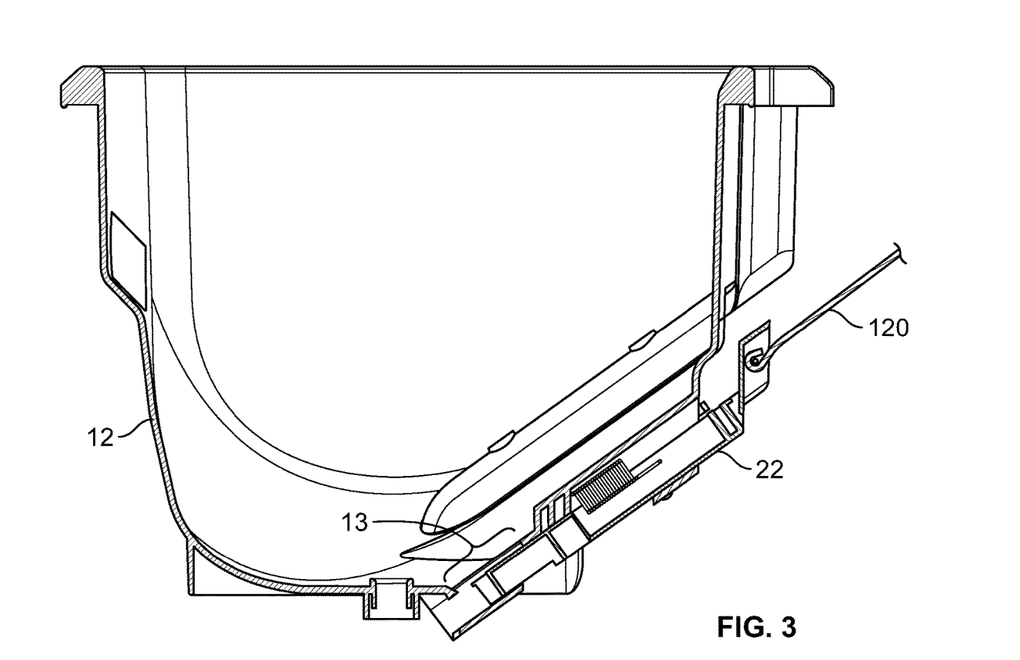
FIG. 3 is a first cross-sectional view of a portion of a broadcast spreader, in accordance with various embodiments of the present invention.

FIGS. 1 and 2 illustrate front and rear perspective views, respectively, of a broadcast spreader 10, in accordance with various embodiments of the present invention. As shown, broadcast spreader 10 may include a base portion on which one or more wheels 14 and a material spreader 20 are mounted. The base portion may also include a transmission 15 for translating the rolling motion of the wheels 14 into a rotation of the material spreader 20. Spreader 10 also includes a hopper 12 for retaining the material to be spread, a deflector 16 for adjusting the spread angle, a stand 18 and a handle assembly 100. The hopper 12 may include a gate 22 for selectively covering an aperture 13 (shown in FIG. 3) of the hopper 12. FIG. 3 shows a side cross-sectional view of the hopper 12 and gate 22, with other parts removed, in accordance with various embodiments of the present invention. The handle assembly 100 includes a connecting portion 105 having an end connected to the base, a handle portion coupled with the other end of the connecting portion 105 and comprising one or more handles 110, a control assembly 150, one or more optionally rigid linkages 120 coupling the control assembly 100 with the gate 22, and a cable 130 coupling the control assembly 100 with the deflector 16. As shown, the handle portion, including handles 110, is generally perpendicular to the connecting portion 105 and the ground.

Figure 4:
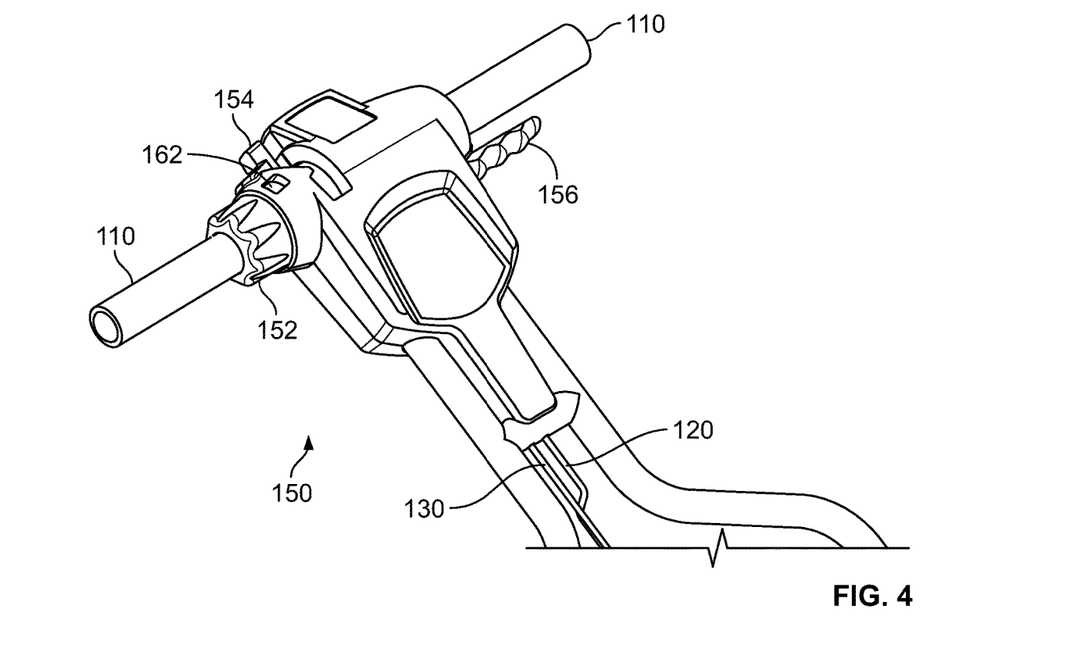
FIG. 4 is a perspective view of a covered control panel for a broadcast spreader, in accordance with various embodiments of the present invention.
Figure 5:
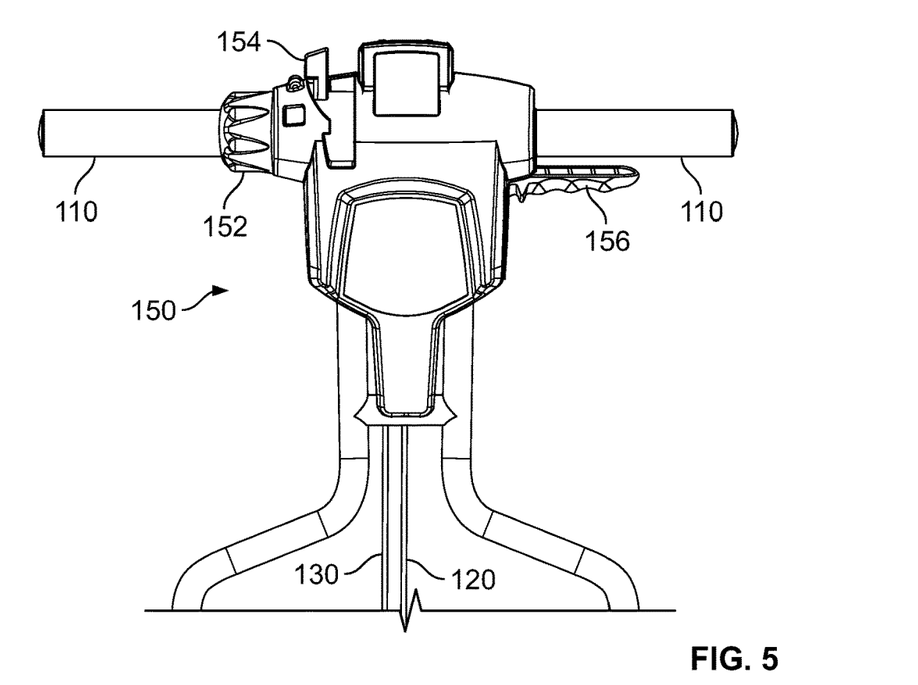
FIG. 5 is an elevated view of a covered control panel for a broadcast spreader, in accordance with various embodiments of the present invention.

FIGS. 4 and 5 show perspective and elevational views, respectively, of a control assembly 150, in accordance with various embodiments of the present invention. The control assembly 150 includes a gate actuation lever 156. During use, pulling the gate actuation lever 156 causes the gate 22 to open a certain amount. The control assembly 150 also includes a gate adjustment dial 152 for adjusting the maximum amount by which the gate 22 may be opened when the gate actuation lever 156 is pulled. The gate adjustment dial is mounted on, and generally axially aligned with, one of the handles 110, such that a user may adjust the gate adjustment dial 152 without completely removing her hand from the corresponding handle 110. In some embodiments, rotating gate adjustment dial 152 in one direction increases the maximum amount by which the gate 22 can be opened, and rotating gate adjustment dial 152 in the other direction decreases the maximum amount by which the gate 22 can be opened. The control assembly 150 may also include an indicator 162 rotatably coupled with the gate adjustment dial 152 for indicating, e.g., through a numeric scale, the current setting of the gate adjustment dial 152. The control assembly 150 may also include a deflector adjustment lever 154 for raising and lowering the deflector 16. In some embodiments, when the deflector adjustment lever 154 is pushed forward, the deflector 16 rises, and when the deflector adjustment lever 154 is pulled back, the deflector 16 lowers.

Figure 6:
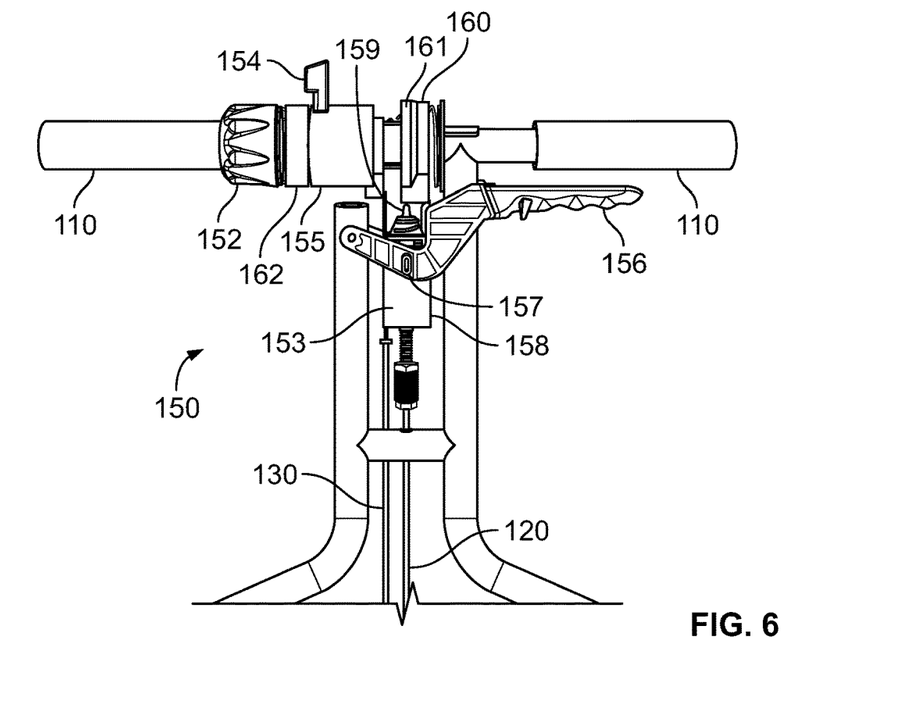
FIG. 6 is an elevated view of an uncovered control panel for a broadcast spreader, in accordance with various embodiments of the present invention.
Figure 7:
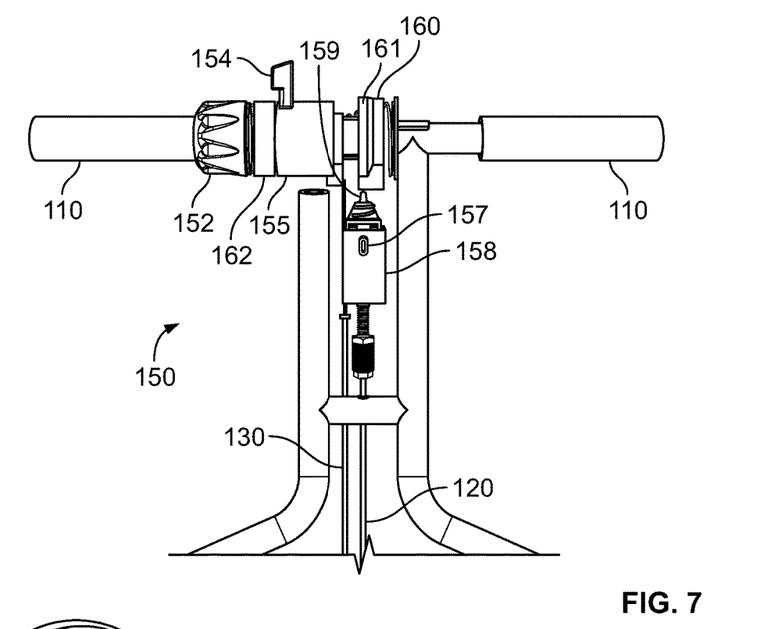
FIG. 7 is an elevated view of an uncovered control panel for a broadcast spreader with the gate lever removed, in accordance with various embodiments of the present invention.
Figure 8:
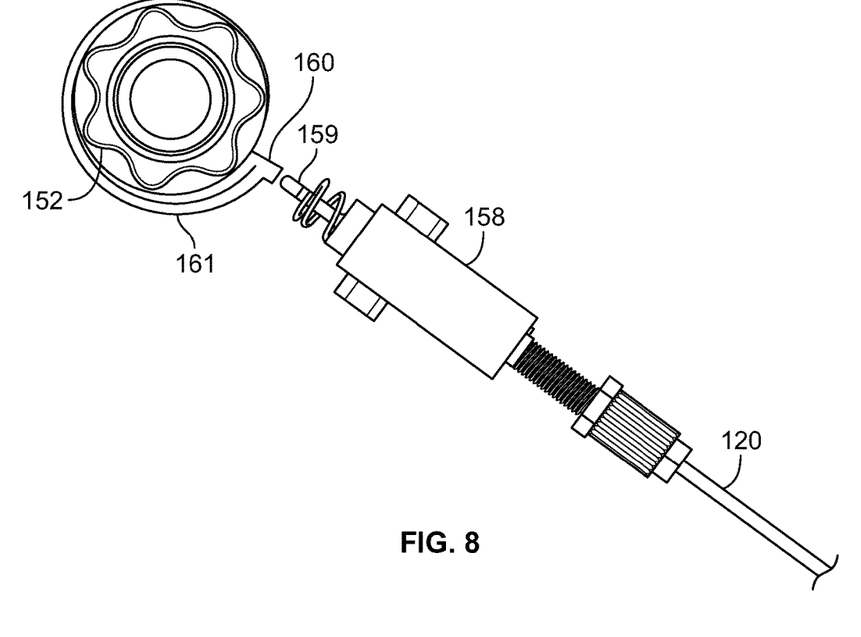
FIG. 8 is a side view of a portion of a control assembly for a broadcast spreader, in accordance with various embodiments of the present invention.

FIG. 6 illustrates the control assembly 150 of FIGS. 4 and 5, with the outer housing removed so as to reveal the inner-workings of control assembly 150, in accordance with various embodiments of the present invention. FIG. 7 further illustrates the control assembly of FIG. 6, with the gate actuation lever 156 removed, and FIG. 8 is a side view of the control assembly 150 of FIG. 7, with the piping of the handle assembly 100 and the cable 130 removed. As shown in FIGS. 6-8, control assembly 150 includes a traveler 158 that includes an outer shell 153 and a limiter 159. Traveler 158 is coupled with gate actuation lever 156 via protrusion 157. Actuation of the gate actuation lever 156 causes traveler 158 to move longitudinally along the handle assembly 100. Traveler 158 is also coupled with linkage 120, and thus upward movement of traveler 158 pulls on linkage 120, which in turn causes the gate 22 to open. Such upward movement of the traveler 158 continues to cause the gate 22 to be further opened until the limiter 159 abuts the cam surface 161 of cam 160 (discussed in more detail below).

Figure 9:
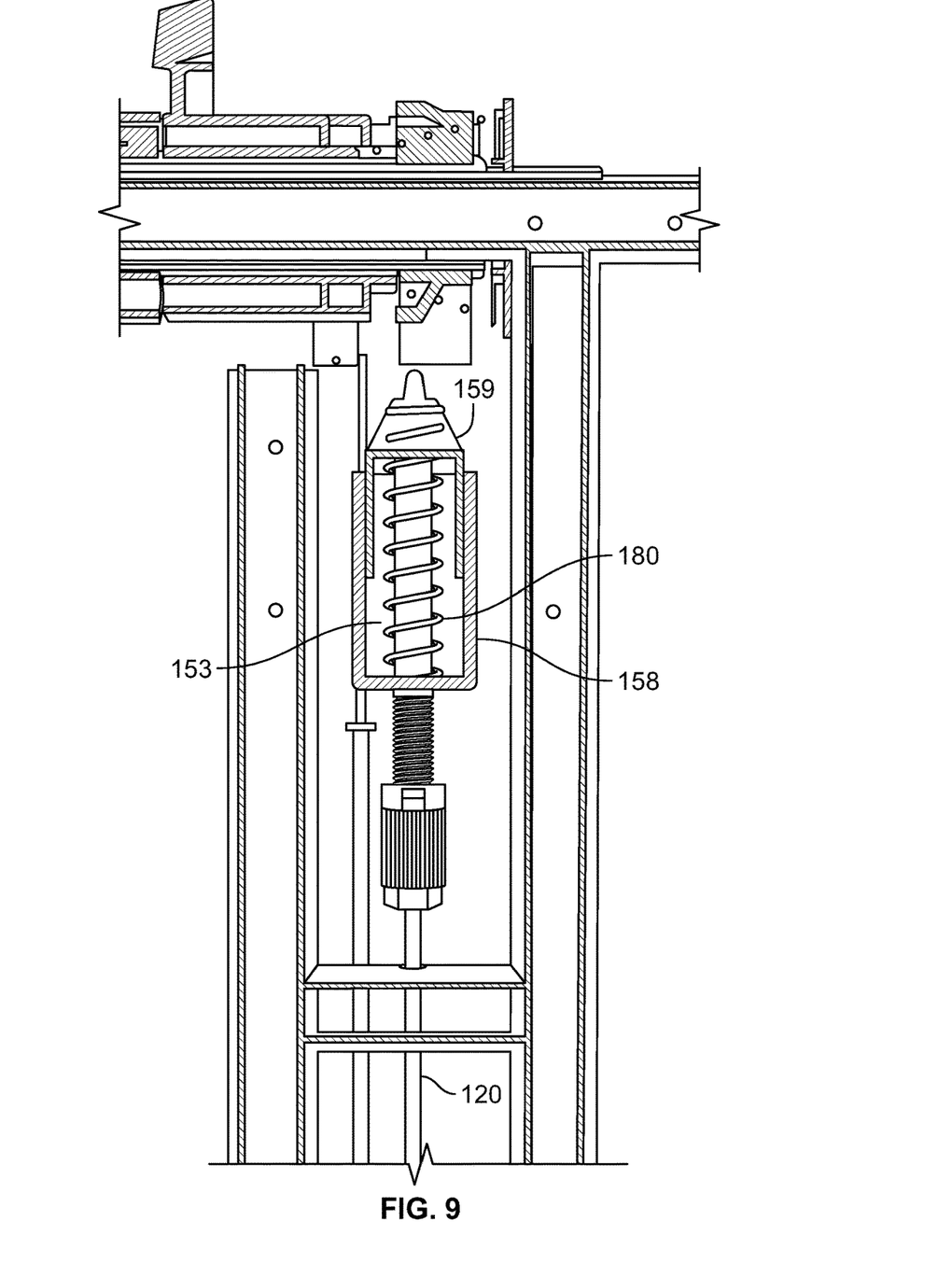
FIG. 9 is a cross-sectional view of a portion of a control assembly for a broadcast spreader, in accordance with various embodiments of the present invention.

In some embodiments, traveler 158 may permit gate actuation lever 156 to be further drawn back after limiter 159 abuts cam surface 161, but without further opening gate 22. FIG. 9 illustrates a portion of the control assembly 150 in which the outer shell 153 and limiter 159 of traveler 158 have been cross-sectioned, in accordance with various embodiments of the present invention. As shown, limiter 159 is spring-biased within the outer shell 153 of traveler 158 by spring 180. Spring 180 comprises a sufficient tension such that limiter 159 will generally move longitudinally along with the outer shell 153 of the traveler 159 until the traveler 159 makes contact with cam surface 161. Once limiter 159 does abut cam surface 161, limiter 159 will no longer travel further upward, but the outer shell 153 may continue to travel further upward, i.e. through compression of spring 180, thereby permitting gate actuation lever 156 to be fully drawn by the user, irrespective of the position of cam surface 161 relative to limiter 159.

Figure 10:
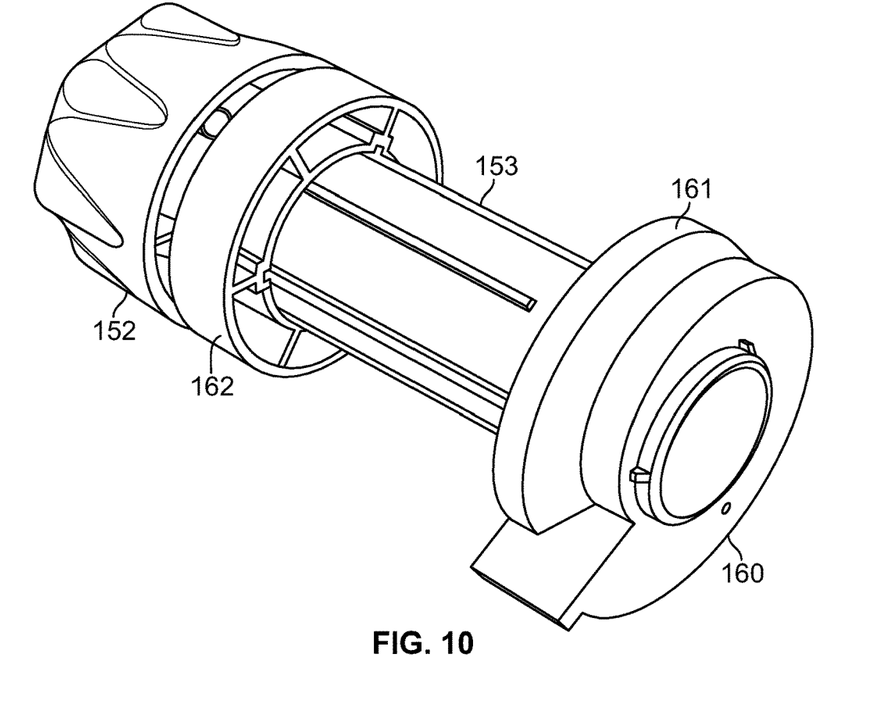
FIG. 10 is a perspective view of a gate aperture control mechanism for a broadcast spreader, in accordance with various embodiments of the present invention.
Figure 11:
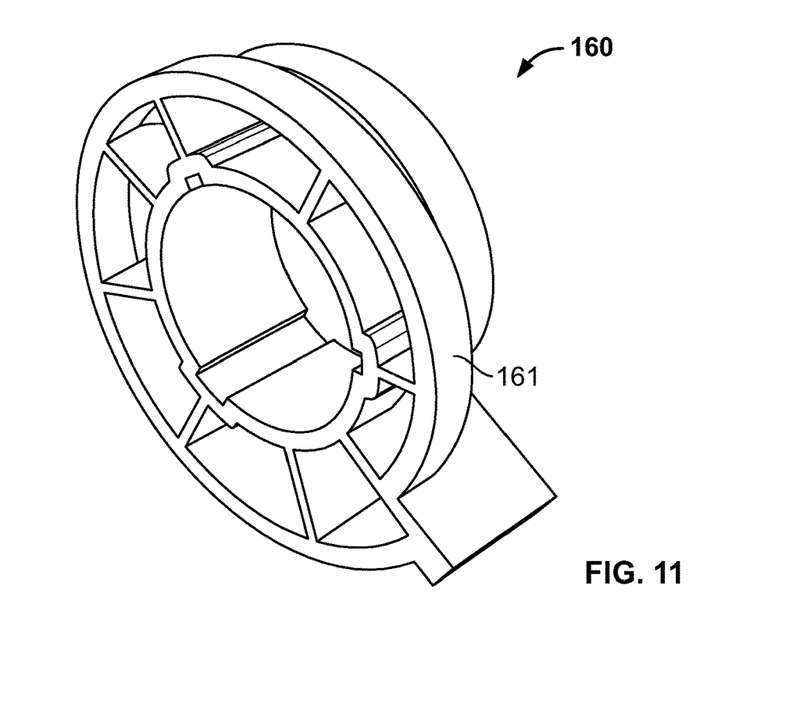
FIG. 11 is a perspective view of a cam for a gate aperture control mechanism for a broadcast spreader, in accordance with various embodiments of the present invention.

FIG. 10 is a perspective view of a gate adjustment dial 152, a cam 160 and related parts, and FIG. 11 is a perspective view of a cam 160, both in accordance with various embodiments of the present invention. As shown, gate adjustment dial 152 is coupled with cam 160 via cylinder 153. Thus, when viewed from the side shown in FIG. 8, a clockwise rotation of the gate adjustment dial 152 generally causes the thickness of the cam surface 161 to increase, thereby reducing the maximum amount by which the gate 22 can be opened. Conversely, a counter-clockwise rotation of the gate adjustment dial 152 generally causes the thickness of the cam surface 161 to decrease, thereby increasing the maximum amount by which the gate 22 can be opened. The control assembly 150 may also include an indicator 162 rotatably coupled with the gate adjustment dial for indicating, e.g., through a numeric scale (not shown), the current setting of the gate adjustment dial 152.

Figure 12:
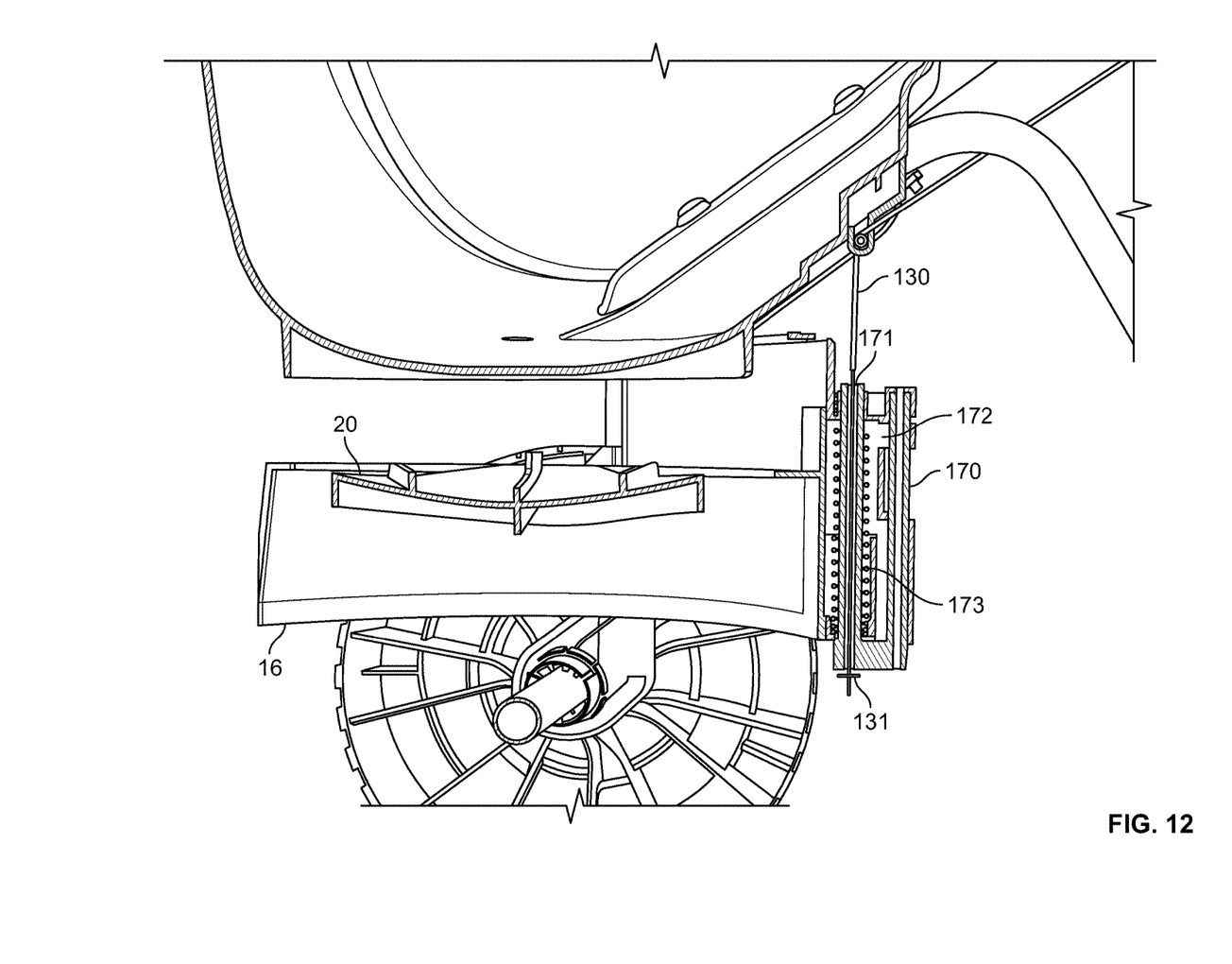
FIG. 12 is a second cross-sectional view of a portion of a broadcast spreader, in accordance with various embodiments of the present invention.
Figure 13:
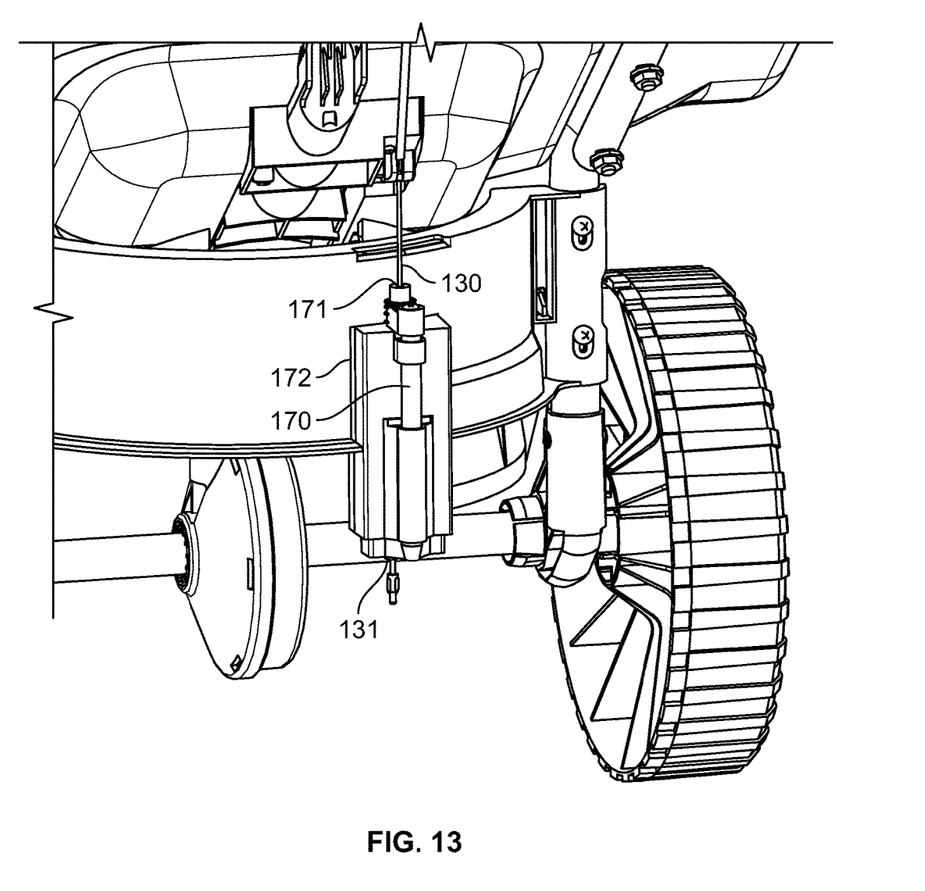
FIG. 13 shows a portion of a deflector height mechanism of a broadcast spreader, in accordance with various embodiments of the present invention.

As noted above, control assembly 150 may also include a deflector adjustment lever 154 for raising and lowering the deflector 16. The deflector adjustment lever 154 may be coupled with one end of cable 130, such that pushing the lever forward pulls on cable 130 (see, e.g., FIGS. 5 and 6). FIGS. 12 and 13 respectively show side cross-sectional and rear perspective views of a deflector assembly, in accordance with various embodiments of the present invention. As shown, the other end of cable 130 is coupled with a deflector lift member 170 via channel 171 and stopper 131. The deflector lift member 170 is coupled with the deflector 16. Thus, when the deflector adjustment lever 154 is pushed forward, the deflector adjustment lever 154 pulls on cable 130, which in turn pulls upward on the deflector lift member 170, which in turn causes the deflector 16 to rise. Conversely, when the deflector adjustment lever 154 is pulled back, the deflector adjustment lever 154 relieves tension on cable 130, which, due to gravity and/or a bias from spring 173, causes the deflector lift member 170 to lower, which in turn causes the deflector 16 to lower.

Thus, various embodiments provide for a broadcast spreader with an improved control mechanism. By positioning the gate adjustment dial coaxially with a handlebar, embodiments allow for convenient, on-the-fly adjustment of gate aperture, without the user having to bend over or to cease pushing the spreader. This enables the user to fine-tune disbursement rate, whereas the user may be discouraged from doing so with less convenient configurations and may instead be content to continue using a less-than-optimum setting.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A control apparatus for a broadcast spreader, the broadcast spreader including a base having a plurality of wheels mounted thereon, the control apparatus comprising:
   a handle portion coupled to the base enabling a user to push the broadcast spreader, the handle portion having a handle axis passing longitudinally therethrough generally parallel to a surface upon which the wheels rest;
   a connecting portion having a first end coupled with the base and a second end coupled with the handle portion, the handle portion being generally perpendicular to the connecting portion;
   a gate adjustment dial mounted on, and having a rotational axis coaxial with a longitudinal axis of the handle portion, wherein rotation of the gate adjustment dial in a first direction causes an increase in a current maximum discharge rate of the spreader and rotation of the gate adjustment dial in a second direction causes a decrease in the current maximum discharge rate of the spreader.

2. The control apparatus of claim 1 further comprising:
a gate actuation lever, wherein operation of the gate actuation lever in a first direction causes an increase in a discharge rate of the spreader and operation of the gate actuation lever in a second direction causes a decrease in the discharge rate of the spreader.

3. The control apparatus of claim 2, wherein the gate adjustment dial controls a maximum amount by which the gate actuation lever may increase the discharge rate of the spreader.

4. The control apparatus of claim 2 further comprising a cam, wherein rotation of the gate adjustment dial causes a rotation of the cam, and wherein further the cam controls a maximum amount by which the gate actuation lever may increase the discharge rate of the spreader.

5. The control apparatus of claim 4 further comprising:
a traveler coupled with the gate actuation lever, wherein operation of the gate actuation lever causes a linear movement of the traveler,
wherein the cam includes a cam surface, and
wherein operation of the gate actuation lever in the first direction causes the discharge rate of the spreader to increase until the traveler abuts the cam surface.

6. The control apparatus of claim 5, wherein the cam has a cam axis about which the cam rotates and the cam surface has a varying radius relative to the cam axis, wherein further rotation of the gate adjustment dial in the first direction causes the radius to decrease at a point along the cam surface that is in line with a direction of travel of the traveler, and wherein further rotation of the gate adjustment dial in the second direction causes the radius to increase at the point along the cam surface that is in line with the direction of travel of the traveler.

7. The control apparatus of claim 1 further comprising a deflector adjustment lever, wherein operation of the deflector adjustment lever in a first direction causes a deflector of the spreader to rise, and operation of the deflector adjustment lever in a second direction causes the deflector to lower.

8. The control apparatus of claim 7, wherein the deflector adjustment lever is positioned on a same side of the handle portion as the gate adjustment dial relative to an imaginary plane that bisects the handle portion across the axis.

9. A broadcast spreader comprising:
a base;
a plurality of wheels mounted on the base;
a handle assembly coupled to the base for enabling a user to push the broadcast spreader, the handle assembly having a connecting portion and a handle portion, the connecting portion having a first end coupled with the base and a second end coupled with the handle portion, the handle portion being generally perpendicular to the connecting portion and generally perpendicular to a surface upon which the wheels rest, the handle portion having a handle axis passing longitudinally through the center thereof; and
a gate adjustment dial having a rotational axis, the gate adjustment dial mounted on the handle portion with the handle axial generally coaxial with the rotational axis of the gate adjustment dial, wherein rotation of the gate adjustment dial in a first direction causes an increase in a current maximum discharge rate of the spreader and rotation of the gate adjustment dial in a second direction causes a decrease in the current maximum discharge rate of the spreader.

10. The broadcast spreader of claim 9, wherein the broadcast spreader further includes a hopper having an aperture and a gate for covering and at least partially uncovering the aperture, and wherein rotation of the gate adjustment dial in the first direction causes an increase in a current maximum amount by which the gate may be opened relative to the aperture and rotation of the gate adjustment dial in the second direction causes a decrease in the current maximum amount by which the gate may be opened relative to the aperture.

11. The broadcast spreader of claim 9 further comprising:
a gate actuation lever, wherein operation of the gate actuation lever in a first direction causes an increase in a discharge rate of the spreader and operation of the gate actuation lever in a second direction causes a decrease in the discharge rate of the spreader.

12. The broadcast spreader of claim 11, wherein the gate adjustment dial controls a maximum amount by which the gate actuation lever may increase the discharge rate of the spreader.

13. The broadcast spreader of claim 11 further comprising a cam, wherein rotation of the gate adjustment dial causes a corresponding rotation of the cam, and wherein further the cam controls a maximum amount by which the gate actuation lever may increase the discharge rate of the spreader.

14. The broadcast spreader of claim 13 further comprising:
a traveler coupled with the gate actuation lever, wherein operation of the gate actuation lever causes a linear movement of the traveler,
wherein the cam includes a cam surface, and
wherein operation of the gate actuation lever in the first direction causes the discharge rate of the spreader to increase until the traveler abuts the cam surface.

15. The broadcast spreader of claim 14 further comprising one or more linkages coupled between the traveler and the gate, the linkages adapted to translate motion of the traveler into motion of the gate.

16. The broadcast spreader of claim 14, wherein the cam has a cam axis about which the cam rotates and the cam surface has a varying radius relative to the cam axis, wherein further rotation of the gate adjustment dial in the first direction causes the radius to decrease at a point along the cam surface that is in line with a direction of travel of the traveler, and wherein further rotation of the gate adjustment dial in the second direction causes the radius to increase at the point along the cam surface that is in line with the direction of travel of the traveler.

17. The broadcast spreader of claim 9 further comprising a deflector adjustment lever, wherein operation of the deflector adjustment lever in a first direction causes a deflector of the spreader to rise, and operation of the deflector adjustment lever in a second direction causes the deflector to lower.

18. The broadcast spreader of claim 17, wherein the deflector adjustment lever is positioned on a same side of the handle portion as the gate adjustment dial relative to an imaginary plane that bisects the handle portion across the axis.

19. A broadcast spreader comprising:
a base;
a hopper supported by the base and having an aperture and a gate for covering and at least partially uncovering the aperture;
a plurality of wheels mounted on the base;
a handle assembly coupled to the base for enabling a user to push the broadcast spreader, the handle assembly having a connecting portion and a handle portion, the connecting portion having a first end coupled with the base and a second end coupled with the handle portion, the handle portion being generally perpendicular to the connecting portion and generally perpendicular to a surface upon which the wheels rest, the handle portion having a handle axis passing longitudinally through the center thereof;
a gate actuation lever mounted on the handle assembly;
a traveler, having a first and second traveler part, coupled with the gate actuation lever, wherein operation of the gate actuation lever causes a corresponding linear movement of the traveler along a traveler movement line passing through perpendicular to the handle axis;
one or more linkages coupled between the traveler and the gate, the linkages adapted to translate motion of the traveler into corresponding motion of the gate;
a gate adjustment dial mounted on, the handle portion, the gate adjustment dial having a rotational axis generally coaxial with the handle axis;
a cam coupled with the gate adjustment dial and having a cam axis about which the cam rotates and a cam surface having a varying radius relative to the cam axis, wherein rotation of the gate adjustment dial causes a corresponding rotation of the cam and the cam axis is coaxial with the rotational axis of the gate adjustment dial;
a biasing member within the traveler, the biasing member resisting motion between the first traveler part and the second traveler part along the traveler movement line such that operation of the gate actuation lever compresses the biasing member when the traveler abuts the cam surface and allows the first traveler part to move relative to the second traveler part;
wherein operation of the gate actuation lever in a first direction causes the gate to move towards an open position until a contact surface of the traveler abuts the cam surface at the point where the cam surface meets the traveler movement line, thereby increasing a discharge rate of the spreader until the traveler abuts the cam surface, and operation of the gate actuation lever in a second direction causes the gate to move towards the closed position, thereby decreasing the discharge rate of the spreader; and
wherein rotation of the gate adjustment dial in a first direction causes the radius of the cam surface relative to the cam axis to decrease at a point along the cam surface that is in line with a direction of travel of the traveler, thereby increasing a current maximum discharge rate of the spreader, and wherein further rotation of the gate adjustment dial in a second direction causes the radius to increase at the point along the cam surface that is in line with the direction of travel of the traveler, thereby causing a decrease in the current maximum discharge rate of the spreader.

20. The broadcast spreader of claim 19 wherein the gate actuation lever is coupled with the second traveler part, and the one or more linkages are coupled with the first traveler part;
wherein, until the traveler abuts the cam surface, operation of the gate actuation lever causes both the first traveler part and the second traveler part to move in the direction generally parallel with the connecting portion; and
wherein, after the traveler abuts the cam surface, operation of the gate actuation lever causes the second traveler part to move relative to the first traveler part while the first traveler part remains stationary relative to the cam surface.

\* \* \* \* \*